US012588036B2

(12) United States Patent
Schober et al.

(10) Patent No.: US 12,588,036 B2
(45) Date of Patent: Mar. 24, 2026

(54) EVENT-BASED MONITORING OF DCI

(71) Applicant: NOKIA TECHNOLOGIES OY, Espoo (FI)

(72) Inventors: Karol Schober, Helsinki (FI); Chunli Wu, Beijing (CN); Jussi-Pekka Koskinen, Oulu (FI); Timo Koskela, Oulu (FI); Jorma Kaikkonen, Oulu (FI); Mads Lauridsen, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 311 days.

(21) Appl. No.: 18/033,435

(22) PCT Filed: Oct. 23, 2020

(86) PCT No.: PCT/CN2020/123242
§ 371 (c)(1),
(2) Date: Apr. 24, 2023

(87) PCT Pub. No.: WO2022/082725
PCT Pub. Date: Apr. 28, 2022

(65) Prior Publication Data
US 2024/0023130 A1 Jan. 18, 2024

(51) Int. Cl.
*H04W 4/00* (2018.01)
*H04W 72/12* (2023.01)
(Continued)

(52) U.S. Cl.
CPC ......... *H04W 72/232* (2023.01); *H04W 72/12* (2013.01); *H04W 72/563* (2023.01)

(58) Field of Classification Search
CPC ............................ H04W 72/12; H04W 72/563
See application file for complete search history.

(56) References Cited

U.S. PATENT DOCUMENTS

| | | | | |
|---|---|---|---|---|
| 10,278,207 B2 * | 4/2019 | Lee | ...................... | H04W 56/00 |
| 10,939,420 B2 * | 3/2021 | Kim | ..................... | H04W 76/28 |

(Continued)

FOREIGN PATENT DOCUMENTS

| | | |
|---|---|---|
| CN | 101547502 A | 9/2009 |
| CN | 104540166 A | 4/2015 |

(Continued)

OTHER PUBLICATIONS

International Search Report and Written Opinion corresponding to PCT International Appln. No. PCT/CN2020/123242, dated Jul. 22, 2021.

(Continued)

*Primary Examiner* — Elisabeth Benoit Magloire
(74) *Attorney, Agent, or Firm* — Nokia Technologies Oy

(57) ABSTRACT
An apparatus comprises means for monitoring a physical downlink control channel using a first monitoring pattern, determining, based on a condition, to monitor the physical downlink control channel using a second monitoring pattern, determining occurrence of at least one event associated with transmission from the user equipment, determining whether to monitor the physical downlink control channel using the first monitoring pattern or the second monitoring pattern based on the occurrence of the at least one event and monitoring the physical downlink control channel using the first monitoring pattern or the second monitoring pattern based on the determination.

12 Claims, 9 Drawing Sheets

S1 — Monitoring a physical downlink control channel using a first monitoring pattern S2 — Determining, based on a condition, to monitor the physical downlink control channel using a second monitoring pattern S3 — Determining occurrence of at least one event related to transmission from the user equipment S4 — Determining whether to monitor the physical downlink control channel using the first monitoring pattern or the second monitoring pattern based on the occurrence of the at least one event S5 — Monitoring the physical downlink control channel using the first monitoring pattern or the second monitoring pattern based on the determination

(51) Int. Cl.
  *H04W 72/232*     (2023.01)
  *H04W 72/563*     (2023.01)

(56)            References Cited

U.S. PATENT DOCUMENTS

| | | | |
|---|---|---|---|
| 2011/0059745 A1 | 3/2011 | Yi et al. | |
| 2019/0081740 A1 | 3/2019 | Kaikkonen et al. | |
| 2019/0223164 A1 | 7/2019 | He et al. | |
| 2020/0100179 A1 | 3/2020 | Zhou et al. | |
| 2020/0229092 A1 | 7/2020 | Wu et al. | |
| 2020/0313834 A1 | 10/2020 | He | |
| 2020/0314745 A1* | 10/2020 | Yi | H04W 72/23 |
| 2020/0404735 A1* | 12/2020 | Nam | H04L 1/0003 |
| 2021/0227562 A1* | 7/2021 | Mazloum | H04L 1/08 |

FOREIGN PATENT DOCUMENTS

| | | |
|---|---|---|
| CN | 110719645 A | 1/2020 |
| CN | 110832919 A | 2/2020 |
| CN | 110876179 A | 3/2020 |
| CN | 111226482 A | 6/2020 |
| CN | 111316581 A | 6/2020 |
| CN | 111 432 460 A | 7/2020 |
| CN | 111742502 A | 10/2020 |
| CN | 114503664 A | 5/2022 |
| CN | 115552978 A | 12/2022 |
| EP | 3 651 506 A2 | 5/2020 |
| WO | 2020/143981 A1 | 7/2020 |
| WO | 2020/199121 A1 | 10/2020 |
| WO | 2020/204802 A1 | 10/2020 |

OTHER PUBLICATIONS

Qualcomm Incorporated, "Potential phy channel designs for NR unlicensed", 3GPP TSG RAN WG1 Meeting #92bis, Sanya, China, Apr. 16-20, 2018, R1-1804830, 8 pages.

First Office Action dated Apr. 19, 2024 corresponding to Chinese Patent Application No. 202080106632.X, with English summary thereof.

Institute for Information Industry (III), "Discussion on beam failure recovery mechanism," 3GPP Draft; R1-1708874, 3GPP TSG-RAN WG1 Meeting #89, Hangzhou, China May 15-19, 2017, May 5, 2017.

Extended European Search Report dated Jun. 25, 2024 corresponding to European Patent Application No. 20958307.9.

Qualcomm Incorporated, "Potential extension(s) to Rel-16 DCI-based power saving adaptation during DRX Active Time," 3GPP Draft; R1-2006817, 3GPP TSG-RAN WG1 #102-e, e-Meeting, Aug. 17-Aug. 28, 2020, Aug. 8, 2020, XP052348189.

Second Office Action dated Nov. 30, 2024, corresponding to Chinese Patent Application No. 202080106632.X, with English translation thereof.

Ericsson, "DL signals and channels for NR-U," 3GPP TSG-RAN WG1 Meeting #98bis, Nov. 18-22, 2019, R1-1912707.

* cited by examiner

300

304

303

302

301

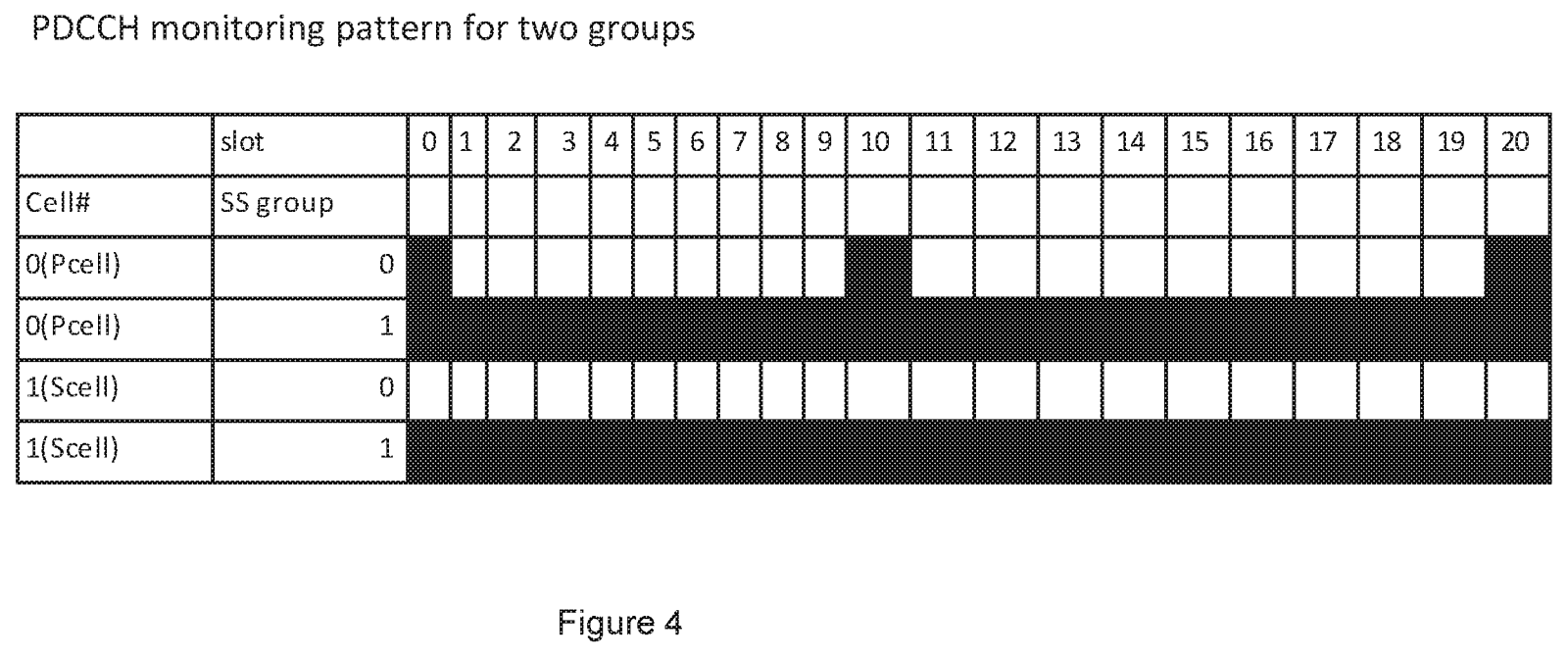

PDCCH monitoring pattern for two groups

| slot | SS group | 0 | 1 | 2 | 3 | 4 | 5 | 6 | 7 | 8 | 9 | 10 | 11 | 12 | 13 | 14 | 15 | 16 | 17 | 18 | 19 | 20 |
|------|----------|---|---|---|---|---|---|---|---|---|---|----|----|----|----|----|----|----|----|----|----|----|
| Cell# | | | | | | | | | | | | | | | | | | | | | | |
| 0(Pcell) | 0 | | | | | | | | | | | | | | | | | | | | | |
| 0(Pcell) | 1 | | | | | | | | | | | | | | | | | | | | | |
| 1(Scell) | 0 | | | | | | | | | | | | | | | | | | | | | |
| 1(Scell) | 1 | | | | | | | | | | | | | | | | | | | | | |

Figure 4

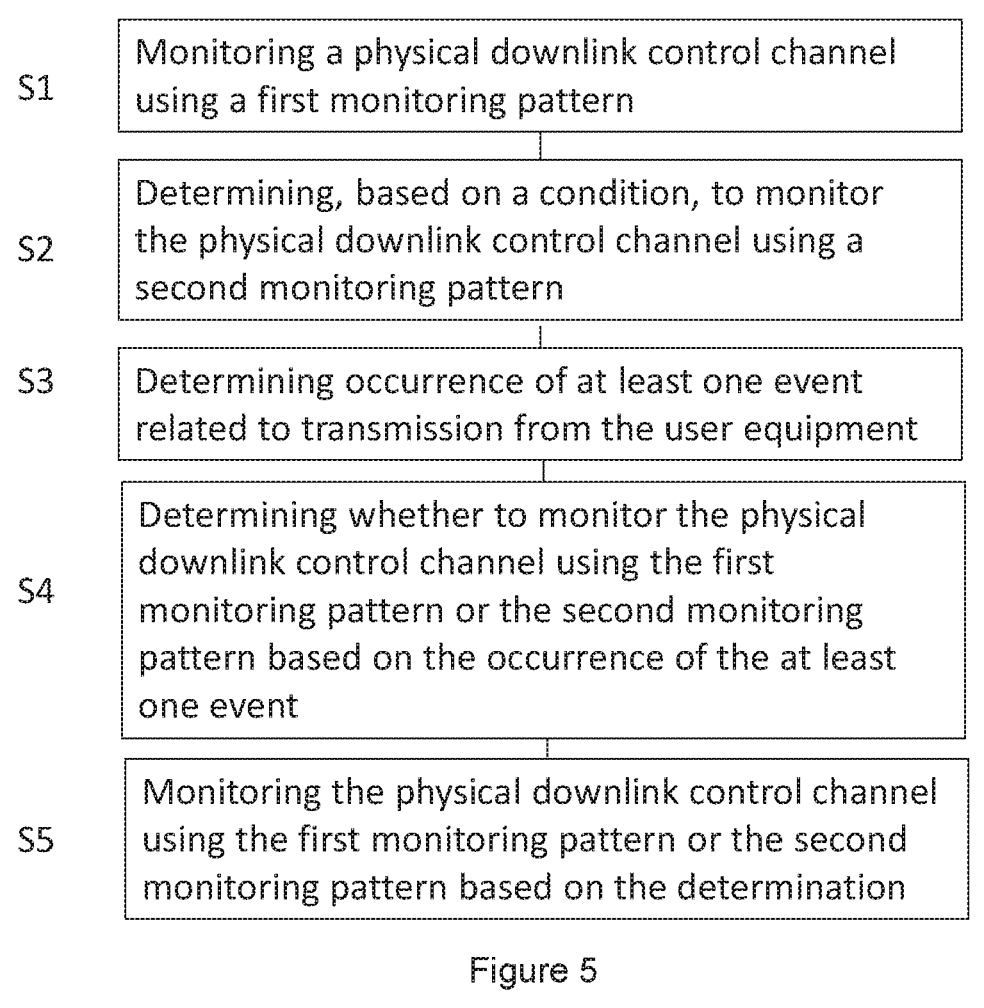

S1 | Monitoring a physical downlink control channel using a first monitoring pattern S2 | Determining, based on a condition, to monitor the physical downlink control channel using a second monitoring pattern S3 | Determining occurrence of at least one event related to transmission from the user equipment S4 | Determining whether to monitor the physical downlink control channel using the first monitoring pattern or the second monitoring pattern based on the occurrence of the at least one event S5 | Monitoring the physical downlink control channel using the first monitoring pattern or the second monitoring pattern based on the determination

Figure 5

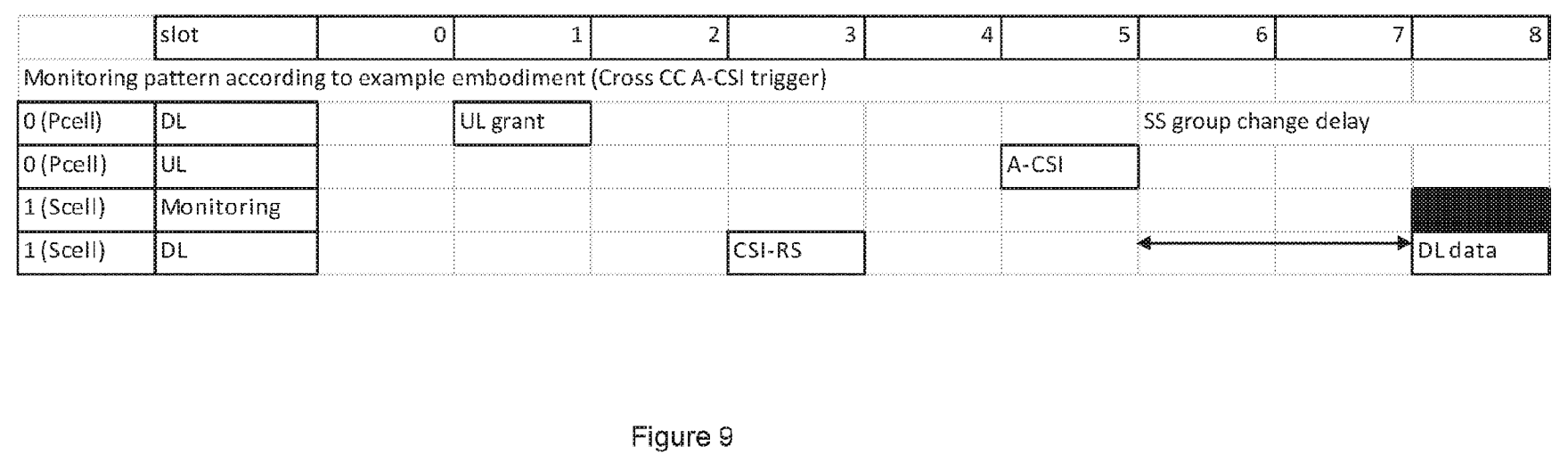

Monitoring pattern according to example embodiment (Cross CC A-CSI trigger)

| slot | 0 | 1 | 2 | 3 | 4 | 5 | 6 | 7 | 8 |
|---|---|---|---|---|---|---|---|---|---|
| 0 (Pcell) DL | | UL grant | | | | | | | |
| 0 (Pcell) UL | | | | | | | | | |
| 1 (Scell) Monitoring | | | | | | | | | |
| 1 (Scell) DL | | | | CSI-RS | | A-CSI | | | DL data |

SS group change delay

Figure 9

EVENT-BASED MONITORING OF DCI

FIELD

The present application relates to a method, apparatus, and computer program and in particular but not exclusively to data activity impact on Downlink Control Information (DCI) based power saving.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for monitoring a physical downlink control channel using a first monitoring pattern, determining, based on a condition, to monitor the physical downlink control channel using a second monitoring pattern, determining occurrence of at least one event related to transmission from the user equipment, determining whether to monitor the physical downlink control channel using the first monitoring pattern or the second monitoring pattern based on the occurrence of the at least one event and monitoring the physical downlink control channel using the first monitoring pattern or the second monitoring pattern based on the determination.

The condition may comprise at least one of an indication from a network node and a status of a timer.

The at least one event related to transmission may comprise at least one of triggering of a scheduling request, transmission of a hybrid automatic repeat request negative acknowledgement, start of a discontinuous reception retransmission timer, reception of downlink control information with cyclic redundancy check scrambled by power saving radio network temporary identifier, expiry of a connected mode discontinuous reception inactivity timer, receiving a trigger for transmission of aperiodic channel state information or sounding reference signals, providing a channel state information report, beam failure detection and receiving an transmission configuration indication from a network node.

The scheduling request may be triggered by a logical channel having a priority above a given threshold.

The first monitoring pattern may comprise monitoring the physical downlink control channel and the second monitoring pattern may comprise performing no physical downlink control channel monitoring.

The second monitoring pattern may be configured for a first time period and the apparatus may comprise means for determining whether to monitor the physical downlink control channel using the first monitoring pattern or the second monitoring pattern based on how long is left of the first time period.

The first monitoring pattern may comprise monitoring a first search space set group with a first periodicity and the second monitoring pattern may comprise monitoring a second search space set group with a second periodicity, wherein the second periodicity is different than the first periodicity.

The apparatus may comprise means for, in the event of beam failure detection, monitoring the physical downlink control channel according to configuration of search space set group containing a beam failure recovery search space otherwise monitoring according to the monitoring pattern before the event.

The apparatus may comprise means for determining whether to monitor the physical downlink control channel using the first monitoring pattern or the second monitoring pattern based on the second periodicity.

The apparatus may comprise means for determining whether to monitor the physical downlink control channel using the first monitoring pattern or the second monitoring pattern based on the relative timing between the event and the condition.

The monitoring pattern may be applied to at least one cell or cell group comprising the at least one cell.

The at least one cell may have triggered the scheduling request.

The at least one cell may be at least one cell allowed by a logical channel that triggered the scheduling request.

In a second aspect, there is provided a method comprising monitoring a physical downlink control channel using a first monitoring pattern, determining, based on a condition, to monitor the physical downlink control channel using a second monitoring pattern, determining occurrence of at least one event related to transmission from the user equipment, determining whether to monitor the physical downlink control channel using the first monitoring pattern or the second monitoring pattern based on the occurrence of the at least one event and monitoring the physical downlink control channel using the first monitoring pattern or the second monitoring pattern based on the determination.

The condition may comprise at least one of an indication from a network node and a status of a timer.

The at least one event related to transmission may comprise at least one of triggering of a scheduling request, transmission of a hybrid automatic repeat request negative acknowledgement, start of a discontinuous reception retransmission timer, reception of downlink control information with cyclic redundancy check scrambled by power saving radio network temporary identifier, expiry of a connected mode discontinuous reception inactivity timer, receiving a trigger for transmission of aperiodic channel state information or sounding reference signals, providing a channel state information report, beam failure detection and receiving an transmission configuration indication from a network node.

The scheduling request may be triggered by a logical channel having a priority above a given threshold.

The first monitoring pattern may comprise monitoring the physical downlink control channel and the second monitoring pattern may comprise performing no physical downlink control channel monitoring.

The second monitoring pattern may be configured for a first time period and the method may comprise determining whether to monitor the physical downlink control channel using the first monitoring pattern or the second monitoring pattern based on how long is left of the first time period.

The first monitoring pattern may comprise monitoring a first search space set group with a first periodicity and the second monitoring pattern may comprise monitoring a second search space set group with a second periodicity, wherein the second periodicity is different than the first periodicity.

The method may comprise, in the event of beam failure detection, monitoring the physical downlink control channel according to configuration of search space set group containing a beam failure recovery search space otherwise monitoring according to the monitoring pattern before the event.

The method may comprise determining whether to monitor the physical downlink control channel using the first monitoring pattern or the second monitoring pattern based on the second periodicity.

The method may comprise determining whether to monitor the physical downlink control channel using the first monitoring pattern or the second monitoring pattern based on the relative timing between the event and the condition.

The monitoring pattern may be applied to at least one cell or cell group comprising the at least one cell.

The at least one cell may have triggered the scheduling request.

The at least one cell may be at least one cell allowed by a logical channel that triggered the scheduling request.

In a third aspect there is provided an apparatus comprising: at least one processor and at least one memory including a computer program code, the at least one memory and computer program code configured to, with the at least one processor, cause the apparatus at least to: monitor a physical downlink control channel using a first monitoring pattern, determine, based on a condition, to monitor the physical downlink control channel using a second monitoring pattern, determine occurrence of at least one event related to transmission from the user equipment, determine whether to monitor the physical downlink control channel using the first monitoring pattern or the second monitoring pattern based on the occurrence of the at least one event and monitor the physical downlink control channel using the first monitoring pattern or the second monitoring pattern based on the determination.

The condition may comprise at least one of an indication from a network node and a status of a timer.

The at least one event related to transmission may comprise at least one of triggering of a scheduling request, transmission of a hybrid automatic repeat request negative acknowledgement, start of a discontinuous reception retransmission timer, reception of downlink control information with cyclic redundancy check scrambled by power saving radio network temporary identifier, expiry of a connected mode discontinuous reception inactivity timer, receiving a trigger for transmission of aperiodic channel state information or sounding reference signals, providing a channel state information report, beam failure detection and receiving an transmission configuration indication from a network node.

The scheduling request may be triggered by a logical channel having a priority above a given threshold.

The first monitoring pattern may comprise monitoring the physical downlink control channel and the second monitoring pattern may comprise performing no physical downlink control channel monitoring.

The second monitoring pattern may be configured for a first time period and the apparatus may be configured to determine whether to monitor the physical downlink control channel using the first monitoring pattern or the second monitoring pattern based on how long is left of the first time period.

The first monitoring pattern may comprise monitoring a first search space set group with a first periodicity and the second monitoring pattern may comprise monitoring a second search space set group with a second periodicity, wherein the second periodicity is different than the first periodicity.

The apparatus may be configured to, in the event of beam failure detection, monitor the physical downlink control channel according to configuration of search space set group containing a beam failure recovery search space otherwise monitor according to the monitoring pattern before the event.

The apparatus may be configured to determine whether to monitor the physical downlink control channel using the first monitoring pattern or the second monitoring pattern based on the second periodicity.

The apparatus may be configured to determine whether to monitor the physical downlink control channel using the first monitoring pattern or the second monitoring pattern based on the relative timing between the event and the condition.

The monitoring pattern may be applied to at least one cell or cell group comprising the at least one cell.

The at least one cell may have triggered the scheduling request.

The at least one cell may be at least one cell allowed by a logical channel that triggered the scheduling request.

In a fourth aspect there is provided a computer readable medium comprising program instructions for causing an apparatus to perform at least the following monitoring a physical downlink control channel using a first monitoring pattern, determining, based on a condition, to monitor the physical downlink control channel using a second monitoring pattern, determining occurrence of at least one event related to transmission from the user equipment, determining whether to monitor the physical downlink control channel using the first monitoring pattern or the second monitoring pattern based on the occurrence of the at least one event and monitoring the physical downlink control channel using the first monitoring pattern or the second monitoring pattern based on the determination.

The condition may comprise at least one of an indication from a network node and a status of a timer.

The at least one event related to transmission may comprise at least one of triggering of a scheduling request, transmission of a hybrid automatic repeat request negative acknowledgement, start of a discontinuous reception retransmission timer, reception of downlink control information with cyclic redundancy check scrambled by power saving radio network temporary identifier, expiry of a connected mode discontinuous reception inactivity timer, receiving a trigger for transmission of aperiodic channel state information or sounding reference signals, providing a channel state information report, beam failure detection and receiving an transmission configuration indication from a network node.

The scheduling request may be triggered by a logical channel having a priority above a given threshold.

The first monitoring pattern may comprise monitoring the physical downlink control channel and the second monitoring pattern may comprise performing no physical downlink control channel monitoring.

The second monitoring pattern may be configured for a first time period and the apparatus may be caused to perform determining whether to monitor the physical downlink control channel using the first monitoring pattern or the second monitoring pattern based on how long is left of the first time period.

The first monitoring pattern may comprise monitoring a first search space set group with a first periodicity and the second monitoring pattern may comprise monitoring a second search space set group with a second periodicity, wherein the second periodicity is different than the first periodicity.

The apparatus may be caused to perform, in the event of beam failure detection, monitoring the physical downlink control channel according to configuration of search space set group containing a beam failure recovery search space otherwise monitoring according to the monitoring pattern before the event.

The apparatus may be caused to perform determining whether to monitor the physical downlink control channel using the first monitoring pattern or the second monitoring pattern based on the second periodicity.

The apparatus may be caused to perform determining whether to monitor the physical downlink control channel using the first monitoring pattern or the second monitoring pattern based on the relative timing between the event and the condition.

The monitoring pattern may be applied to at least one cell or cell group comprising the at least one cell.

The at least one cell may have triggered the scheduling request.

The at least one cell may be at least one cell allowed by a logical channel that triggered the scheduling request.

In a fifth aspect there is provided a non-transitory computer readable medium comprising program instructions for causing an apparatus to perform at least the method according to the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows a schematic diagram of a monitoring pattern for two SS set groups;

FIG. 5 shows a flowchart of a method according to an example embodiment;

FIG. 9 shows a schematic diagram for monitoring patterns according to an example embodiment.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
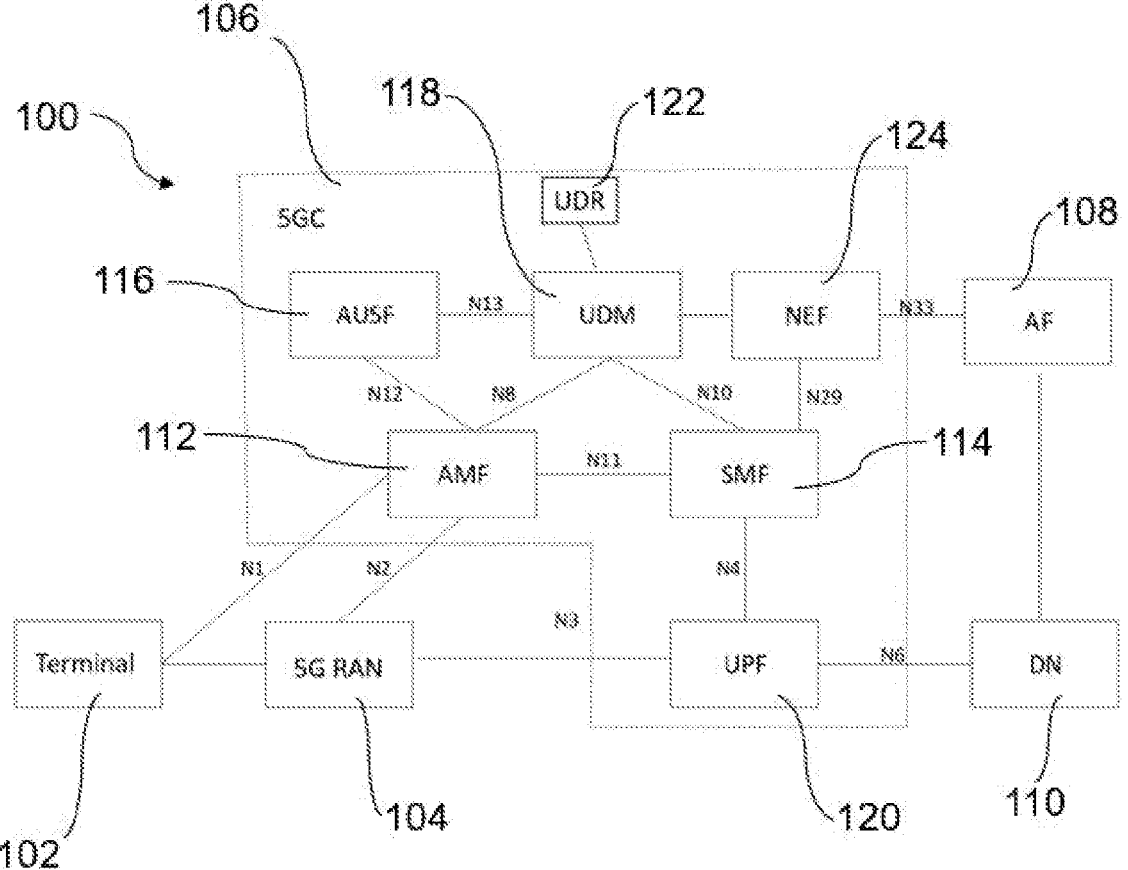
FIG. 1 shows a schematic diagram of an example 5G system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes. An UPF (User Plane Function) whose role is called PSA (PDU Session Anchor) may be responsible for forwarding frames back and forth between the DN (data network) and the tunnels established over the 5G towards the UE(s) exchanging traffic with the DN.

Figure 2:
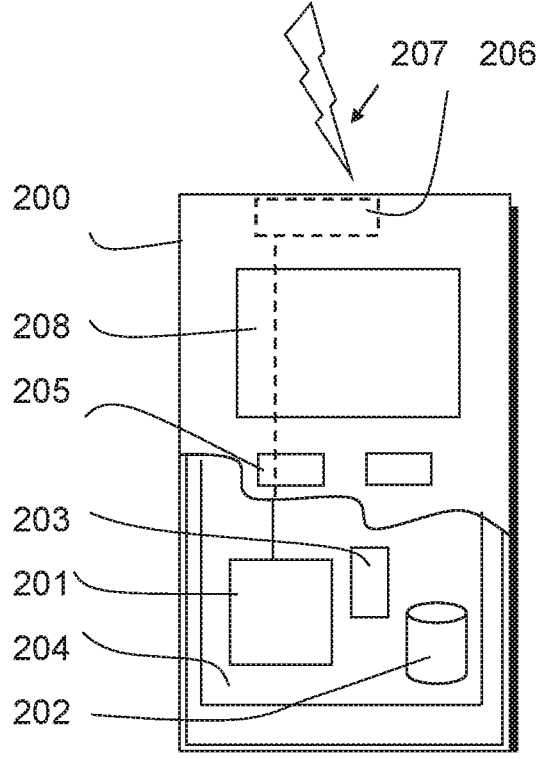
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
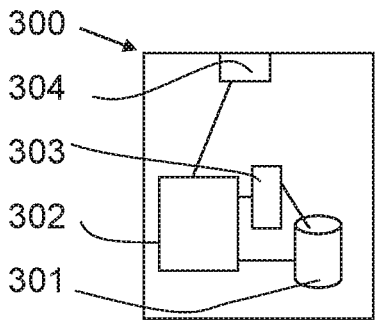
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The following relates to the REL17 work Item on UE Power Saving Enhancements for NR(RP-200938), where DCI-based power saving was listed as one of the objectives:

a) Study and specify, if agreed, extension(s) to Rel-16 DCI-based power saving adaptation during DRX Active Time for an active BWP, including PDCCH monitoring reduction when C-DRX is configured [RAN1]

NOTE: Rel-15 and Rel-16 available power saving solutions should be supported by the UE and included in the evaluation. RAN1 will ask the confirmation from RAN2 that Rel-15 and Rel-16 available power saving solutions are properly utilized.

RAN1 had complied a list of schemes to be considered in the previous meeting RAN1 #102e. The main mechanisms are Downlink Control Information (DCI)-based Physical Downlink Control Channel (PDCCH) skipping indication and DCI and timer based Search Space (SS) Set group switching. UL transmission, e.g. Scheduling Request(SR)/Configured grant (CG) was also mentioned.

Proposal 8: the following triggering schemes for DCI-based power saving adaptation during DRX Active Time can be considered, Scheduling DCI
    The indication of PDCCH monitoring behaviour adaptation can be
        Explicit/implicit indicated by scheduling DCI
        Joint indication of the PDCCH monitoring adaptation with
            cross-slot scheduling defined in Rel-16
            Scell dormancy
            [SS set group switching defined in Rel-16]
    The scheduling DCI for indicating PDCCH monitoring behaviour adaptation can be DCI format x_1/x_2
        DCI format x_1
        DCI format x_2
    Enhancement for retransmission handling
        Apply adaptation only after HARQ ACK condition is fulfilled
        Apply adaptation right after DCI indication but start timer(s) to handle retransmission if required
Non-scheduling DCI
    Group common DCI, e.g., SS set group switching defined in Rel-16
        Explicit indicated by DCI
        Joint indication of the PDCCH monitoring adaptation with
            cross-slot scheduling defined in Rel-16
    DCI format 2_6 to indicate adaptation of the PDCCH monitoring during active time, and it should extend DCI with ps-RNTI is received during active time
    Extension of DCI format 2_6 to indicate adaptation of the PDCCH monitoring during next DRX cycle in the active time
    Unicast non-scheduling DCI, e.g., DCI format 0_1 and 1_1 for case 2 dormancy indication
    [Timer based adaptation to adapt PDCCH monitoring behavior, including skipping or monitoring set adaption,
        A timer e.g., similar to Timer searchSpaceSwitching-Timer-r16, can trigger the UE to switch between search space set group 0 and 1]
    UL transmission, e.g., SR/CG
By means of configured search space groups, a gNB may adapt a UE's PDCCH monitoring behaviour (e.g., SS set configurations), and such adaptation in between the groups may reduce or increase the UE PDCCH monitoring (e.g. via different SS periodicities). This may enable power saving.

The functionality of R16 SS switching can be summarized with the below bullets
    NR-U introduced SS-group (search-space-group) switching configuration
        One or more SS sets form a GROUP0
        One or more SS sets form a GROUP1
        Some search-space sets may remain ungrouped and are monitored always
    Switching behavior
        GC-PDCCH 1-bit toggles groups, or
        Detection of PDCCH in GROUP0 triggers change from GROUP0 to GROUP1

COT-end triggers change GROUP1→GROUP0
        Timer based change GROUP1→GROUP 0
    Multiple cells can be grouped and switched synchronously FIG. 4 illustrates an example of how monitoring may be configured on two cells for a UE. A gNB may configure synchronized switching for Pcell, and Scell and the UE does not monitor on Scell if group 1 is active for configured Pcell+Scell cell group.

With DCI-based PDCCH skipping, the network (NW) can indicate a certain period that the UE can skip monitoring PDCCH. With SS set group switching, the NW can switch between different SS set groups with different pre-configured PDCCH occasion periodicities (this including also zero-monitoring if SS group is empty) or a UE can autonomously change the SS set group based on a timer. It is up to NW implementation how to make such decisions, e.g., based on if there is data available for transmission, the latency requirement of the data for transmission or a scheduler algorithm.

With regard to interaction with the current Discontinuous Reception (DRX) mechanism, the general assumption is that PDCCH skipping/SS set group switching works on top of L2 Connected mode-DRX (C-DRX), so with PDCCH skipping the UE might not monitor PDCCH even during active time according to DRX and the NW may switch to different SS set without impact on the DRX timers.

When the network (NW) sends a PDCCH skipping command or SS set group switching command (or SS set group is switched based on a timer), the NW would not be able to take into account activities at the UE side. If uplink (UL)/downlink (DL) activity happens after the PDCCH skipping command and the timer for skipping is running or after the SS set is switched to a less frequent PDCCH occasions configuration, it may not be desirable that the UE only monitors PDCCH after the skipping timer is expired or after a delay (2 slots after transmitted PDCCH+gNB waiting for first monitoring location of low periodicity SS group) for the SS set switching case, for example, if the UL activity is SR triggered by high priority data or DL data is high priority data.

In Legacy LTE and NR DRX, a UE moves to active time after SR transmission and the UE monitors PDCCH for random access response regardless of DRX.

The interaction between PDCCH skipping and Random access channel (RACH) has been considered and it has been proposed to determine whether to use PDCCH skipping based on different conditions, e.g. NW initiated or UE initiated, Random access (RA) triggers etc.

The interaction between PDCCH skipping and CG has been considered and it has been proposed to interrupt the skipping or not depending on the priority of data to be transmitted.

The interaction between SS group switching cross-slot scheduling and DRX has been considered.

FIG. 5 shows a flowchart of a method according to an example embodiment.

In a first step, S1, the method comprises monitoring a physical downlink control channel (PDCCH) using a first monitoring pattern.

In a second step, S2, the method comprises determining, based on a condition, to monitor the PDCCH using a second monitoring pattern.

In a third step, S3, the method comprises determining occurrence of at least one event related to transmission from the user equipment.

In a fourth step, S4, the method comprises determining whether to monitor the PDCCH using the first monitoring pattern or the second monitoring pattern based on the occurrence of the at least one event.

In a fifth step, S5, the method comprises monitoring the PDCCH using the first monitoring pattern or the second monitoring pattern based on the determination.

The condition may comprise at least one of an indication from a network node and a status of a timer.

The first monitoring pattern may comprise monitoring the physical downlink control channel and the second monitoring pattern may comprise performing no PDCCH monitoring, i.e. PDCCH skipping, for a time period. In this case, the condition may be, for example, a DCI-based PDCCH skipping indication as described above.

Alternatively, the first monitoring pattern may comprise monitoring a first search space set group with a first periodicity and the second monitoring pattern may comprises monitoring a second search space set group with a second periodicity wherein the second periodicity is different than the first periodicity, i.e. SS set group switching as described previously. In this case, at least one search space set of one group has different periodicity than at least one search space set of other group the other group may be an empty set.

In this case the condition may be, for example, an indication from the NW to switch between different SS set groups with different pre-configured PDCCH occasion periodicities (this including also zero-monitoring if SS group is empty) or UE can autonomously change the SS group based on a timer.

The method proposes events (or activities) related to transmission from the user equipment that are prioritized over PDCCH skipping command or when SS set group M (of high monitoring periodicity) is active, in which case the UE stops the skipping timer and starts monitoring PDCCH or switches to predefined SS set group N (N different than M, preferably with lower monitoring periodicity).

The method may provide low latency for high priority UL/DL activities even if PDCCH skipping and/or SS set group switching are triggered.

The at least one event may comprise the triggering of a scheduling request. The event may comprise a scheduling request triggered by a logical channel having a priority above a certain threshold. Whether the second monitoring pattern is used may depend on the logical channel (LCH) that triggered the SR, since different LCH may have different thresholds for triggering a SR. That is, the event may be prioritized only if SR is triggered by a LCH with priority above a certain threshold.

Whether the first monitoring pattern or second monitoring pattern is used may depend on how much time is left of the current skipping time period, or how long the periodicity of the SS set currently is.

The method may comprise determining whether to monitor the physical downlink control channel using the first monitoring pattern or the second monitoring pattern based on the relative timing between the event and the condition. For example, whether the first monitoring pattern or the second monitoring pattern is used may depend on if the event happens before or after the PDCCH skipping command, e.g. if it happens X slot before the PDCCH command then the skipping is applied since it is NW decision; while if the event happens after, then the skipping command is not applied (i.e. the UE stops the skipping timer). Similarly, in another example embodiment, if the event happens X slot before SS set group switching, then the UE does not automatically switch to another SS set group. While if the event happens after, the UE switches to another predefined SS set group.

The monitoring pattern may be applied to at least one cell or cell group comprising the at least one cell. The at least one cell may be the cell that triggered the SR, or a cell allowed by the LCH that triggered the SR.

In an example embodiment, SS set group switching may be limited to cells or SS set switching cell groups including the allowed cells for the LCH that triggered the SR. Similarly, stopping PDCCH skipping may also be limited to given cells, e.g., the allowed cells for the LCH that triggered the SR. The SS set group may be switched at first DL slot boundary X symbols after UL slot boundary containing PUCCH resource containing the SR or after the last symbol of PUCCH resource containing the SR.

The SS set group may be changed from group 0 to group 1, or from group N to group M, where M is the SS set group ID specifically configured by NW The event may comprise transmission of Hybrid Automatic repeat Request (HARQ) Negative acknowledgement (NACK) to the NW or the start of DRX retransmission timer if the start of the DRX retransmission timer happens after the skipping command or when SS set group switching group M is active.

The event may comprise receiving a DCP (a DCI with cyclic redundancy check (CRC) scrambled by Power Saving-Radio Network Temporary Identifier (PS-RNTI)). For example, when a DCP (e.g. DCI format 2_6) is received which wakes up the associated OnDuration timer, the UE stops the skipping timer and start monitoring PDCCH, if DCP is received after the PDCCH skipping command which started the skipping timer. This means the UE monitors DCP even if PDCCH skipping timer is running to allow the NW bring the UE back to monitoring PDCCH when high priority DL data becomes available for transmission.

The event may comprise expiry of a C-DRX inactivity timer. For example, when the C-DRX inactivity timer expires, UE stops the skipping timer and start to monitor according to the C-DRX configuration. This means that the skipping timer won't affect the forthcoming active time after inactivity timer expiry e.g. on Durations based on short DRX cycle.

The event may comprise receiving a trigger for transmission of aperiodic channel state information (CSI) on Physical Uplink Shared Channel (PUSCH) or aperiodic Sounding Reference Signal (SRS). The event may be determined for specific triggering states of aperiodic CSI transmission.

The event may comprise providing a CSI report. The CSI report may comprise of a periodic, a-periodic or semi-persistent report. The CSI report may be sent on uplink signaling resources such as PUCCH/PUSCH.

The event may comprise indicating Beam Failure Detection (BFD) and starting to monitor recovery SS (which may be indicated by recoverySearchSpaceId). In the event of BFD, the method may comprise monitoring the physical downlink control channel according to configuration of search space set group containing a beam failure recovery search space otherwise monitoring according to the monitoring pattern before the event.

The event may comprise a transmission configuration indication (TCI) from a network node. For example, on receiving Media Access Control (MAC) Control Element (CE) activation command for a TCI state or tci-StatesPDC-CHToAddList and/or tci-StatesPDCCH-ToReleaseList for at least one serving cell e.g. PCell or at least one Scell, the active SS set group is changed to the SS set group containing Beam Failure Recovery (BFR) SS or to a SS set group configured by NW, if any, otherwise (if BFR SS belongs to the active group, or BFR SS does not belong to any group), not changing SS group.

In one embodiment, the skipping timer may be stopped and monitoring of PDCCH started (or switching to pre-defined SS set group) at the first DL slot boundary N symbols/slots or milliseconds after the UL slot where the proposed uplink activity has occurred. In one example N=0,1,2 . . . In one example the UL activity may be a transmission of any uplink signal/channel described herein (such as SR/CSI on PUCCH or CSI on PUSCH).

Figure 6:
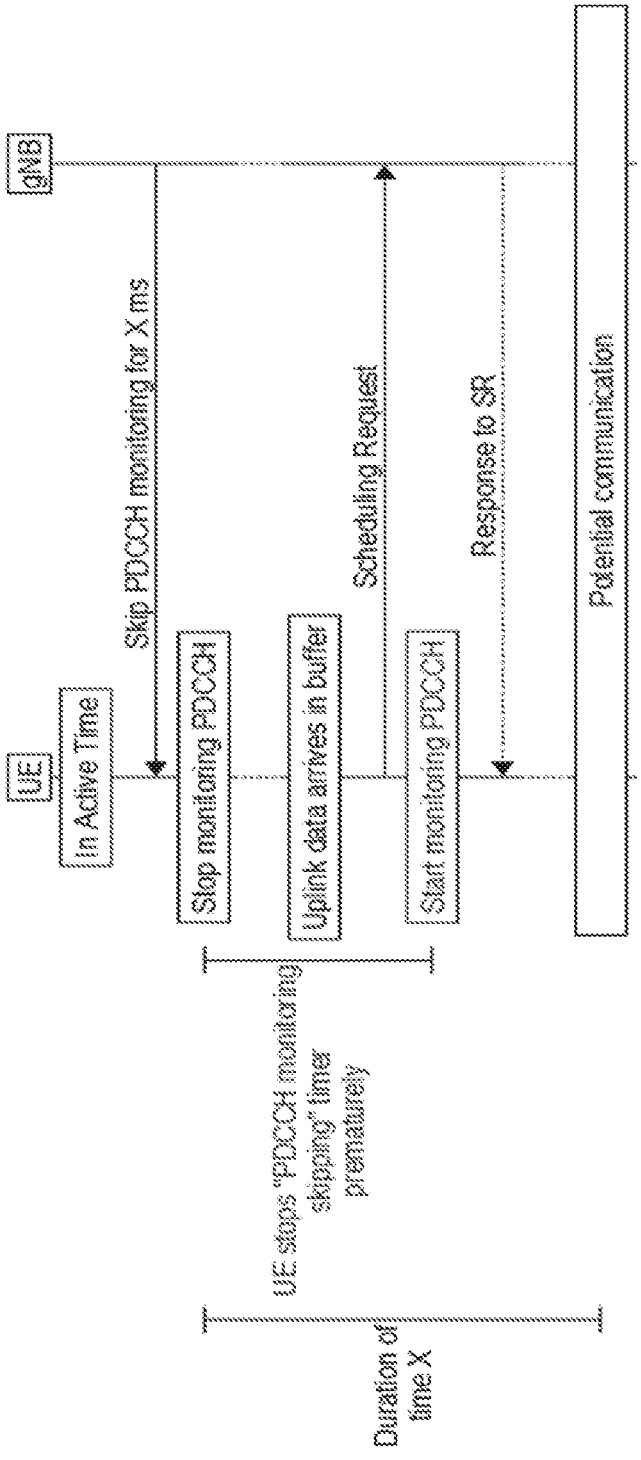
FIG. 6 shows a signalling flow between a UE and a gNB according to an example embodiment.

FIG. 6 shows a flow chart of a method for PDCCH skipping according to an example embodiment.

The UE is in Active Time and receives an indication from a gNB to skip PDCCH monitoring for X ms. On receipt of the indication, the UE stops monitoring PDCCH and starts a timer for X ms.

During time X, uplink data arrives in a buffer of the UE and the UE sends a SR. In response to sending the SR, the UE stops the timer and starts monitoring PDCCH.

Figure 7:
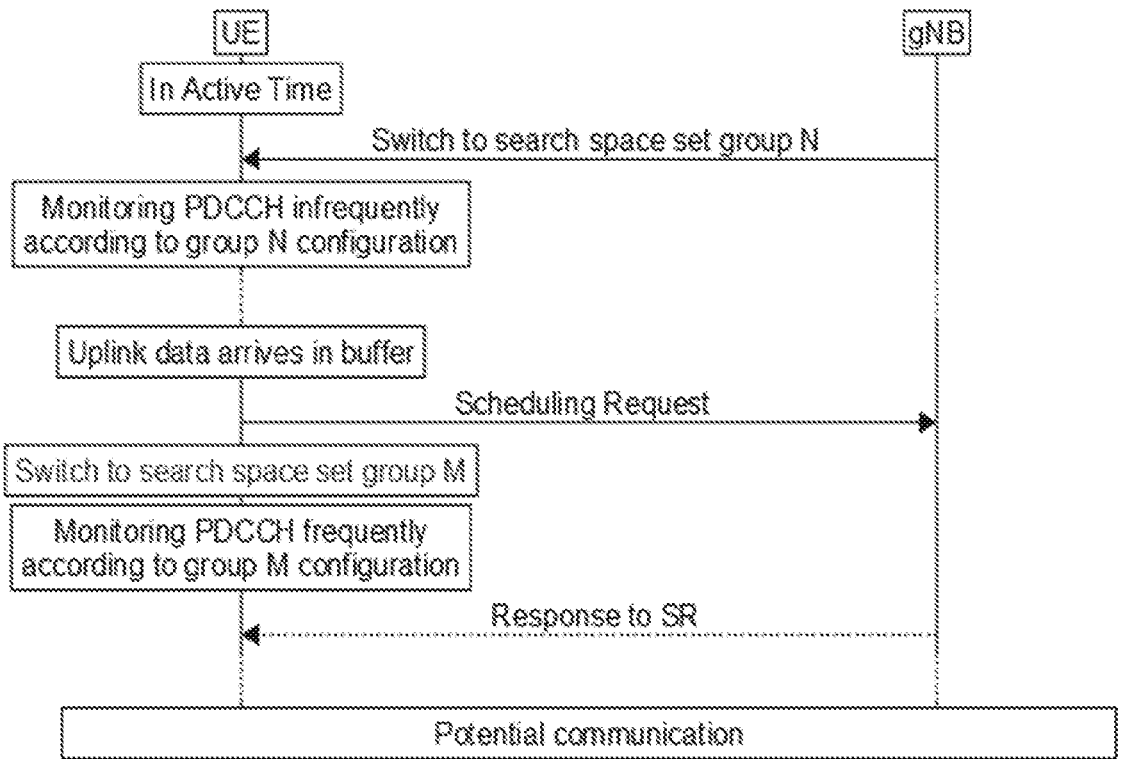
FIG. 7 shows a signalling flow between a UE and a gNB according to an example embodiment.

FIG. 7 shows a flowchart of a method for SS group switching according to an example embodiment.

The UE is in Active Time and receives an indication from a gNB to switch to SS set group N. On receipt of the indication, the UE monitors PDCCH infrequently according to group N configuration.

While the UE monitors PDCCH according to the group N configuration, uplink data arrives in a buffer of the UE and the UE sends a SR. In response to sending the SR, the UE switches to SS set group M.

Figure 8:
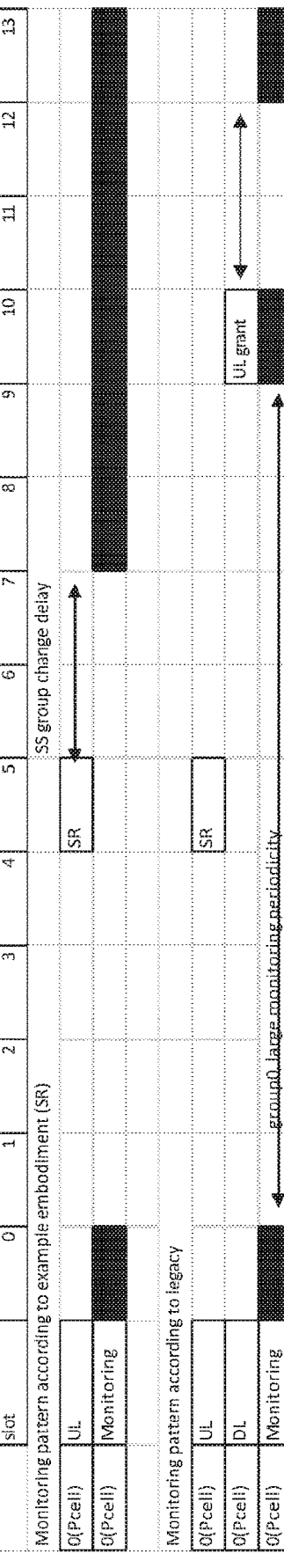
FIG. 8 shows a schematic diagram of monitoring patterns for an example embodiment and legacy examples.

FIG. 8 shows a comparison of proposed scheme to legacy. We assume monitoring pattern from FIG. 4 and SR transmitted by UE in slot #5. In the legacy scheme, a gNB may schedule UL grant only at slot #10 (based on large periodicity SS group 0), thus causing delay for data scheduling. With our proposal, SR to data time may be reduced (by 5 slots in this example).

FIG. 9 illustrates the proposed mechanism for implicit cross-CC SS group change. In here we assume that synchronous switching is not configured between Pcell and Scell.

When gNB wants to start scheduling on Scell because of data arrival, it may trigger A-CSI report in PUSCH on Pcell for Scell, and such switch to more frequent monitoring on Scell.

The method may be implemented in a user equipment as described with reference to FIG. 2.

An apparatus may comprise means for monitoring a physical downlink control channel using a first monitoring pattern, determining, based on a condition, to monitor the physical downlink control channel using a second monitoring pattern, determining occurrence of at least one event related to transmission from the user equipment, determining whether to monitor the physical downlink control channel using the first monitoring pattern or the second monitoring pattern based on the occurrence of the at least one event and monitoring the physical downlink control channel using the first monitoring pattern or the second monitoring pattern based on the determination.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5GS, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
at least one processor; and
at least one memory storing instructions that, when executed by the at least one processor, cause the apparatus at least to:
monitor a physical downlink control channel using a first monitoring pattern;
determine, based on a condition, to monitor the physical downlink control channel using a second monitoring pattern;
determine occurrence of at least one event associated with transmission from the apparatus;
determine whether to monitor the physical downlink control channel using the first monitoring pattern or the second monitoring pattern based on the occurrence of the at least one event; and
monitor the physical downlink control channel using the first monitoring pattern or the second monitoring pattern based on the determination;
wherein the first monitoring pattern comprises monitoring a first search space set group with a first periodicity and the second monitoring pattern comprises monitoring a second search space set group with a second periodicity, wherein the second periodicity is different than the first periodicity.

2. The apparatus according to claim 1, wherein the condition comprises at least one of the following: an indication from a network node or a status of a timer.

3. The apparatus according to claim 1, wherein the at least one event associated with transmission comprises at least one of the following:
triggering of a scheduling request,
transmission of a hybrid automatic repeat request negative acknowledgement,
start of a discontinuous reception retransmission timer,
reception of downlink control information with cyclic redundancy check scrambled by power saving radio network temporary identifier,
expiry of a connected mode discontinuous reception inactivity timer,
receiving a trigger for transmission of aperiodic channel state information or sounding reference signals,
providing a channel state information report,
beam failure detection, or
receiving a transmission configuration indication from a network node.

4. The apparatus according to claim 3, wherein the scheduling request is triggered by a logical channel having a priority above a given threshold.

5. The apparatus according to claim 1, wherein the at least one memory and the instructions, when executed by the at least one processor, further cause the apparatus at least to:
in the event of beam failure detection, monitor the physical downlink control channel according to configuration of search space set group containing a beam failure recovery search space; and
in the event that no beam failure was detected, monitor the physical downlink control channel according to the monitoring pattern before the event.

6. The apparatus according to claim 1, wherein the at least one memory and the instructions, when executed by the at least one processor, further cause the apparatus at least to:
determine whether to monitor the physical downlink control channel using the first monitoring pattern or the second monitoring pattern based on the second periodicity.

7. The apparatus according to claim 1, wherein the at least one memory and the instructions, when executed by the at least one processor, further cause the apparatus at least to:
determine whether to monitor the physical downlink control channel using the first monitoring pattern or the second monitoring pattern based on a time difference between the event and the condition.

8. The apparatus according to claim 1, wherein the monitoring pattern is applied to at least one cell or cell group comprising the at least one cell.

9. The apparatus according to claim 8 wherein the at least one cell triggered the scheduling request.

10. The apparatus according to claim 9, wherein the at least one cell is at least one cell allowed by a logical channel that triggered the scheduling request.

11. A method, comprising:
monitoring a physical downlink control channel using a first monitoring pattern;
determining, based on a condition, to monitor the physical downlink control channel using a second monitoring pattern;
determining occurrence of at least one event associated with transmission from the user equipment;
determining whether to monitor the physical downlink control channel using the first monitoring pattern or the second monitoring pattern based on the occurrence of the at least one event; and
monitoring the physical downlink control channel using the first monitoring pattern or the second monitoring pattern based on the determination;
wherein the first monitoring pattern comprises monitoring a first search space set group with a first periodicity and the second monitoring pattern comprises monitoring a second search space set group with a second periodicity, wherein the second periodicity is different than the first periodicity.

12. A non-transitory computer readable medium comprising program instructions that, when executed by an apparatus, cause the apparatus to perform at least the following:
monitoring a physical downlink control channel using a first monitoring pattern;
determining, based on a condition, to monitor the physical downlink control channel using a second monitoring pattern;
determining occurrence of at least one event associated with transmission from the user equipment;
determining whether to monitor the physical downlink control channel using the first monitoring pattern or the second monitoring pattern based on the occurrence of the at least one event; and

17 monitoring the physical downlink control channel using the first monitoring pattern or the second monitoring pattern based on the determination;

wherein the first monitoring pattern comprises monitoring a first search space set group with a first periodicity and the second monitoring pattern comprises monitoring a second search space set group with a second periodicity, wherein the second periodicity is different than the first periodicity.

* * * * *

18